(12) United States Patent
Rey et al.

(10) Patent No.: US 9,301,641 B2
(45) Date of Patent: Apr. 5, 2016

(54) BEVERAGE DISPENSER WITH AUTOMATIC CLOSURE OF THE POWDER CONTAINERS CHUTES

(75) Inventors: Cedric Rey, La Sarraz (CH); Sven Zwicker, St. Gallen (CH); Michel Hess, Winterthur (CH); Silvio Lardelli, St. Gallen (CH)

(73) Assignee: Nestec S.A., Vevey (CH)

(*) Notice: Subject to any disclaimer, the term of this patent is extended or adjusted under 35 U.S.C. 154(b) by 189 days.

(21) Appl. No.: 14/235,308

(22) PCT Filed: Jul. 18, 2012

(86) PCT No.: PCT/EP2012/064070
§ 371 (c)(1),
(2), (4) Date: Jan. 27, 2014

(87) PCT Pub. No.: WO2013/014040
PCT Pub. Date: Jan. 31, 2013

(65) Prior Publication Data
US 2014/0150671 A1    Jun. 5, 2014

(30) Foreign Application Priority Data

Jul. 28, 2011 (EP) .................................... 11175677

(51) Int. Cl.
| | | |
|---|---|---|
| A23F 3/00 | (2006.01) |
| A23F 5/00 | (2006.01) |
| B67D 7/74 | (2010.01) |
| B67D 7/78 | (2010.01) |
| B67B 1/00 | (2006.01) |
| B65D 88/54 | (2006.01) |
| G01F 11/00 | (2006.01) |
| A47J 31/46 | (2006.01) |
| A47J 31/40 | (2006.01) |
| G07F 11/44 | (2006.01) |
| G07F 13/06 | (2006.01) |

(52) U.S. Cl.
CPC ................ *A47J 31/46* (2013.01); *A47J 31/401* (2013.01); *G07F 11/44* (2013.01); *G07F 13/06* (2013.01)

(58) Field of Classification Search
CPC ......... A47J 31/401; A47J 31/46; G07F 13/06; G07F 11/44
USPC ........... 99/279, 323.3; 221/45, 154, 260, 271, 221/276; 222/74, 129–129.4, 142.2, 142.7, 222/142.9, 145.4, 153.12–153.14, 322, 336, 222/406–407, 511–514
See application file for complete search history.

(56) References Cited

U.S. PATENT DOCUMENTS

| | | | | |
|---|---|---|---|---|
| 5,033,659 A * | 7/1991 | Marks | .................. | A47L 15/4409 134/57 D |
| 6,550,648 B2 * | 4/2003 | Bardin | .................. | A47J 31/404 141/351 |
| 7,004,355 B1 * | 2/2006 | Crisp, III | ............. | B67D 1/0021 222/129.4 |

* cited by examiner

*Primary Examiner* — Dana Ross
*Assistant Examiner* — Lindsey C Teaters
(74) *Attorney, Agent, or Firm* — K&L Gates LLP

(57) ABSTRACT

The invention concerns a beverage dispenser comprising: a housing (1), at least one refillable container (2) for storing bulk beverage ingredient, said container comprising a tank (22), a discharge port (5) at the outlet (23) of the tank, at least a beverage preparation unit (3) operatively linked to the container for preparing a beverage from the stored bulk beverage ingredient, a door, wherein the discharge port (6) of the container (2) is configured for being automatically closed due to the opening movement of the door.

13 Claims, 3 Drawing Sheets

BEVERAGE DISPENSER WITH AUTOMATIC CLOSURE OF THE POWDER CONTAINERS CHUTES

CROSS REFERENCE TO RELATED APPLICATIONS

The present application is a National Stage of International Application No. PCT/EP2012/064070, filed on Jul. 18, 2012, which claims priority to European Patent Application No. 11175677.1, filed Jul. 28, 2011, the entire contents of which are being incorporated herein by reference.

FIELD OF THE INVENTION

The present invention relates to a beverage dispenser comprising means for storing and dosing a food ingredient which can be easily refilled.

BACKGROUND OF THE INVENTION

Many beverages like espresso and other coffee beverages, milk beverages, chocolate beverages, . . . are often prepared by dosing and mixing a food soluble powder with a diluent. According to one type of beverage preparation machine the food soluble powder is stored in a non disposable canister that is part of the machine and that is regularly refilled. For the refilling operation the canister is pulled out of the machine, its top is opened and powder is emptied inside. Before pulling the canister out of the machine, its outlet is closed to avoid that ingredient falls out of the container during its removal and that it dirties the dispenser or the floor around the dispenser. When the dispenser comprises several containers, each container outlet must be successively manually closed by the operator. As it is a manual operation, there is always a risk that the operator forgets to close one outlet. Besides, depending on the number of containers, the successive closures of the outlets can take time; moreover each outlet must be reopened too once the containers have been refilled and must be replaced in the dispenser.

One aim of the present invention is to solve these problems and in particular to propose a beverage dispenser comprising at least one beverage ingredient container which can be automatically and systematically closed and opened avoiding an oversight of the operator.

Another aim of the present invention is to propose a beverage dispenser comprising at least one beverage ingredient container in which refilling can be implemented without dirtying the machine environment.

SUMMARY OF THE INVENTION

According to a first aspect, the invention concerns a beverage dispenser comprising:
  a housing,
  at least one refillable container for storing bulk beverage ingredient, said container comprising:
  a tank,
  a discharge port at the outlet of the tank,
  at least one beverage preparation unit operatively linked to the container for preparing a beverage from the stored bulk beverage ingredient,
  a door,
wherein the at least one refillable container is positioned in the housing and the housing is closed by the door, and wherein the discharge port of the container interacts with the door so that the discharge port is opened when the door is closed and is closed when the door is opened.

The beverage dispenser of the present invention comprises a housing in which the different functional elements for preparing the beverages are positioned. In particular at least one refillable container for storing bulk beverage ingredients is positioned in the housing. This container is usually non disposable. It is able to store bulk beverage ingredients that are generally powders, pellets or granules. According to the preferred mode, the beverage ingredients are soluble ingredients like soluble coffee, tea, chocolate, milk, sugar, flavoured powders, . . . The container generally comprises means for dosing the bulk beverage ingredients. It is preferably a rotatable volumetric dosing means placed at the bottom of the tank like an auger or a spring. A beverage preparation unit that prepares a beverage from at least one of the beverage ingredients is also usually positioned in the housing. The beverage preparation unit usually comprises one means for contacting a dose of the beverage ingredient with a diluent. It can be a diluent jet(s) head, a mixing bowl, a whipper bowl, a brewing chamber. The beverage preparation unit is generally positioned or operatively linked to the containers so that it can receive a dose of ingredients therefrom and subsequently put it in contact with a diluent and prepare a beverage. The dispenser also comprises a door which can be opened for having access to the different technical element of the dispenser, in particular the container; for example for refilling the container when it is empty. According to the invention the discharge port of the container is configured for being automatically closed due to the opening movement of the door. Besides in the dispenser of the present invention the discharge port of the container is preferably configured for being automatically opened due to the closing movement of the door. The movement of the door preferably induces the opening and the closure of the discharge port. Preferably, when the door is closed, said door contacts the discharge port of the container so that said discharge port is actuated in an opened position, and when the door is opened and does not contact the discharge port of the container, said discharge port is in a closed position.

According to the preferred embodiment of the invention, the discharge port of the at least one container is configured so as to be closed at rest and be opened if a pressure is exerted on it.

According to the preferred embodiment the discharge port comprises:
  an internal delivery tube comprising a hollowing-out in its bottom part,
  external movable means comprising a hollowing-out in its bottom part, said external movable means covering at least a part of the internal delivery tube and being movable between:
    a position in which the both hollowing-outs of the internal delivery tube and of the external movable means overlap each other, and
    a position in which the surface of the external movable means overlaps and closes the hollowing-out of the delivery tube.

The internal delivery tube of the discharge port is the outlet of the refillable container tank. It is usually a cylinder. The base of the cylinder is preferably closed near the outlet extremity. The ingredients that are delivered by the tube are evacuated by the hollowing out in the bottom of the cylinder. In the present application "bottom" has to be understood to refer to the discharge valve in its normal orientation when inserted in the beverage dispenser as shown for example in FIGS. 1 and 2. Preferably the hollowing out is next to the base of the cylinder. According to an embodiment, the internal delivery tube can comprise a partial weir, preferably a half moon weir, obstructing the lower part of the circular tube in front of its hollowing-out.

The discharge port also comprises external movable means. By external it is meant that this means surrounds the internal delivery tube delivering the ingredients form the container tank. This external means also comprises a hollowing out in its bottom part. This external means is movable so that according to its position its hollowing out can overlap or not the hollowing out of the delivery tube and consequently enable the opening or the closing of the discharge port for delivering ingredients. Preferably the external movable means is a cylinder.

According to the preferred embodiment a part of the external movable means is pushed by the internal face of the door when said door is closing. Consequently when the door is closed, it maintains the movable external means in the position where the discharge port is opened.

According to the preferred embodiment the discharge port comprises at least one elastic member able to exert a force on the movable external means so as to push said means away from the container. The elastic member can be a spring or metal blades fixed on one end to the refillable container and cooperating on the other end with the external movable means. Preferably the elastic member can cooperate with pins on the lateral sides of the external movable means. Generally the elastic member exerts a force sufficient to displace the external movable means to a position in which its hollowing-out does not overlap the hollowing-out of the internal cylinder.

Preferably the internal side of the door presents at least one bump cooperating with the discharge port of the at least one refillable container when the door is closed. Preferably the cooperation consists in pushing the discharge port.

The door can comprise an electromagnetic lock. Preferably the electromagnetic lock is configured so as to open the door when a current passes through the electromagnet lock. Preferably the electromagnetic lock and the force of the electromagnet of the electromagnetic lock is greater than the force indirectly exerted by the at least one elastic member of the at least one discharge port on the door.

Although the invention has been described with one refillable container, it should be appreciated that dispensers comprising several refillable containers each comprising a tank and a discharge port are part of the scope of the invention.

BRIEF DESCRIPTION OF THE DRAWINGS

The characteristics and advantages of the invention will be better understood in relation to.

DETAILED DESCRIPTION OF THE DRAWINGS

Figure 1:
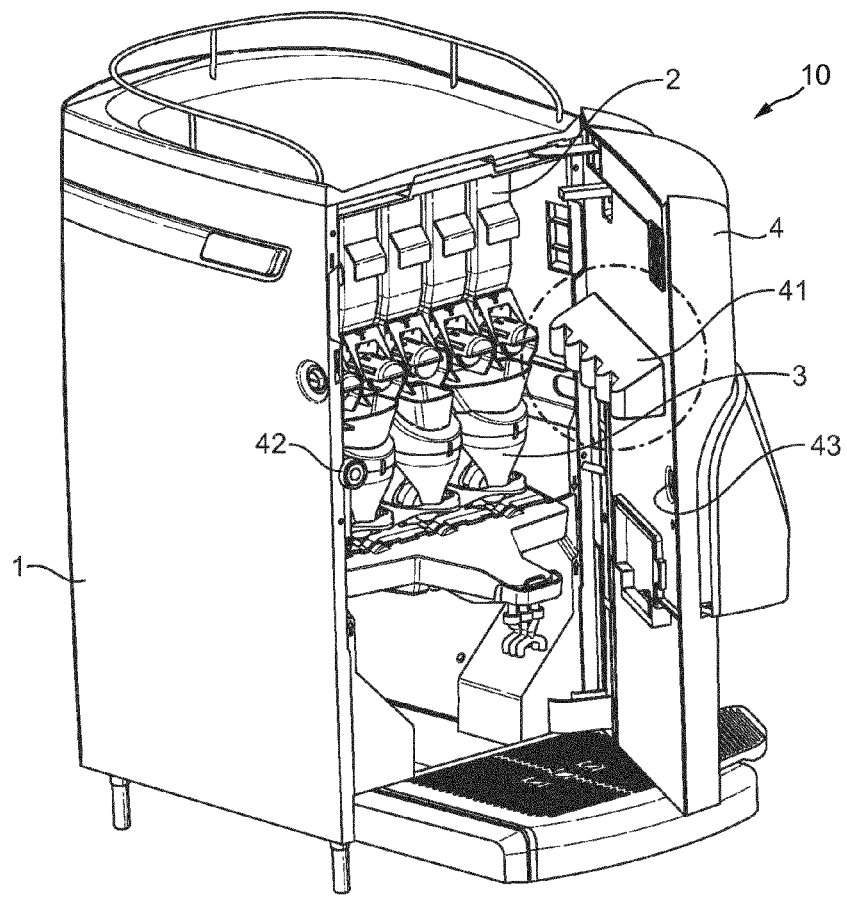
FIG. 1 depicts a perspective view of a dispenser according to the present invention in its operation configuration—that is with the discharge ports opened—the door having been made transparent.
Figure 1A:
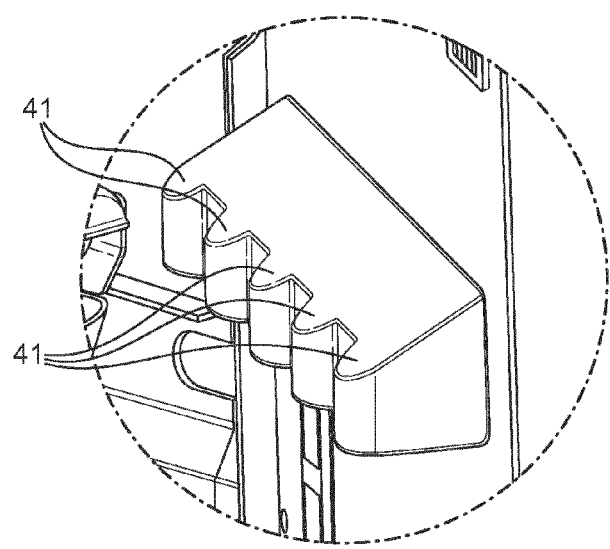
FIG. 1a is a magnified view of a detail of the door of the dispenser.

FIG. 1 illustrates a dispenser 10 according to the present invention of which the door is closed and has been made transparent. The dispenser comprises a housing 1 in which five refillable containers 2 for storing bulk beverage ingredient are positioned. Each container presents a discharge port 5 at one extremity of the bottom of its tank. The discharge ports 5 are oriented so as to deliver the beverage ingredients to three units 3 for contacting the beverage ingredients with a diluent. In the illustrated embodiment these units are whipping bowls yet any other mixing unit could be implemented. The dispenser comprises a door 4 of which internal side presents five bumps 41; these bumps are magnified in FIG. 1a. The dispenser also comprises an electromagnetic lock comprising an electromagnet 42 placed on the housing 1 and cooperating with a metallic part 43 of the door.

Figure 2:
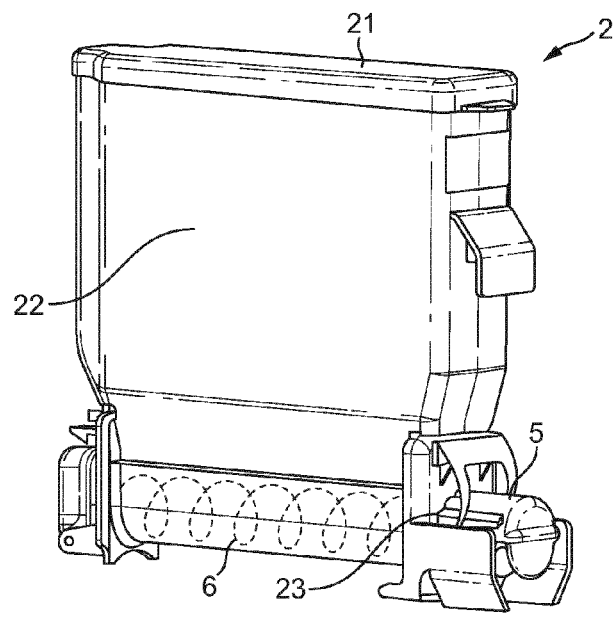
FIG. 2 depicts a perspective view of one of the refillable containers of FIG. 1.
Figure 3:
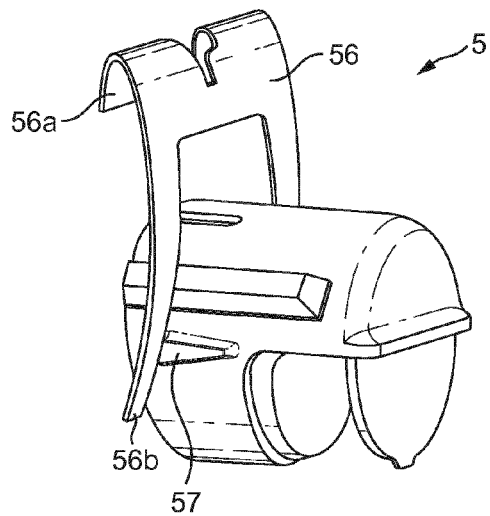
FIG. 3 depicts a perspective view of the discharge port of the container of FIG. 2.
Figure 4:
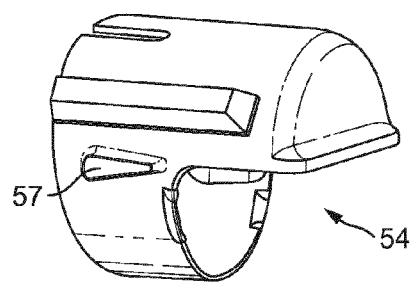
FIGS. 4 and 5 depict two perspective views of the internal and external parts of the discharge port of FIG. 3.
Figure 5:
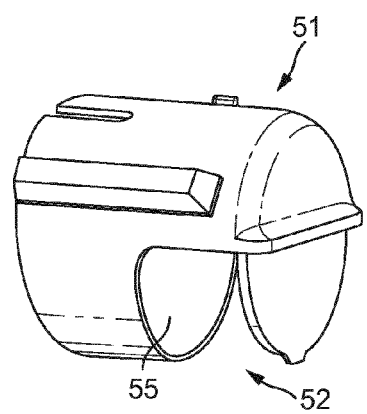

FIG. 2 illustrates a refillable container 2 with a discharge port 5 according to the present invention. The container comprises a tank 22 in which the food ingredient is stored and closed at its top by a cover 21 for refilling. At its internal bottom it comprises a spring auger 6 illustrated in dotted lines which drives the bulk food ingredient to the tank outlet 23 and then to the discharge port 5. As illustrated in FIGS. 3, 4 and 5, the discharge port 5 comprises:
an internal delivery tube 51 comprising a hollowing-out 52 in its bottom part,
external movable means 53 comprising a hollowing-out 54 in its bottom part.

The dimensions of the both hollowing outs and the relative positions of the internal delivery tube and the external movable means when assembled are configured so that the external movable means 53 covers at least a part of the internal delivery tube 51 and the hollowing-outs 52, 54 can overlap each other in a position and cannot in another position. Then the dimension of the hollowing out of the external movable means is configured for overlapping at least the hollowing-out of the delivery tube.

The external movable means 53 presents pins 57 on its lateral sides for cooperating with the end of flexible blades 56 attached by their other end 56a to the wall of the container tank. The flexible blades exert a force on the movable means 53 so as to push said means away from the container that is in a direction corresponding to the opening direction of the door. Due to the movable capacity of the external movable means 53, this means can move between:
a position in which its hollowing-out 54 overlaps the hollowing-out 52 of the internal delivery tube, and
a position in which the surface of the external movable means 53 overlaps and closes the hollowing-out 52 of the delivery tube.

Figure 6:
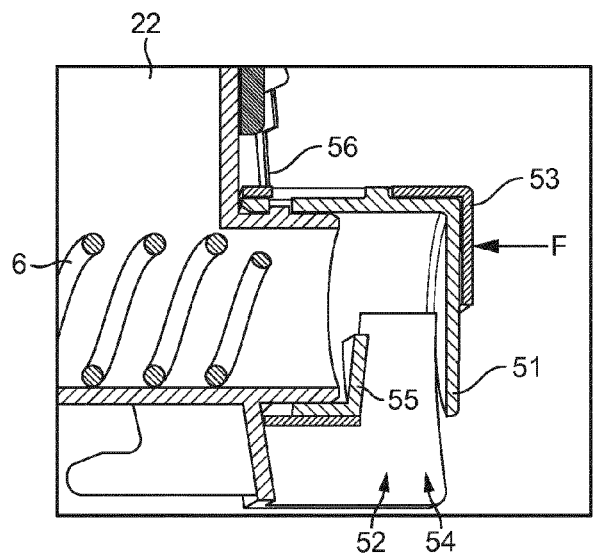
FIG. 6 is cross section view of the discharge port of FIG. 2 in its opened configuration.

In FIGS. 2, 3 and 6 the external movable means 53 is in a position where the door (not illustrated) is in contact with the end of the external movable means 53 and exerts a force F on it: it pushes the external movable means 53 against the force of the flexible arms 56 so that the hollowing out 54 of the external movable means 53 overlaps the hollowing-out 52 of the delivery tube. In this position the ingredient can be delivered from the tank 22 of the container 2 inside a preparation unit 3. In FIG. 1 the five bumps 41 on the internal side of the door are positioned so that when the door 1 is closed each bump contact one discharge port 5 and pushes the external movable means 53 of said port.

Figure 7:
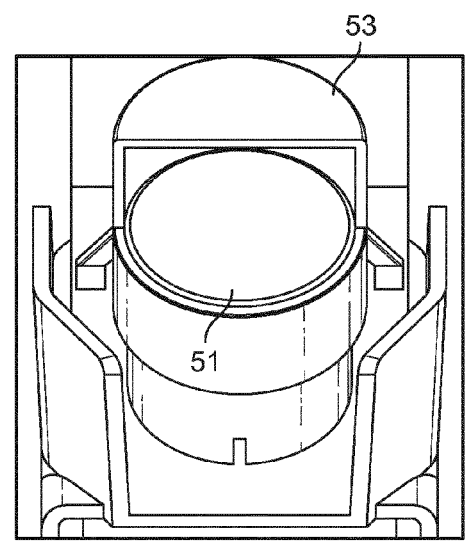
FIG. 7 is a perspective view from the bottom of the discharge port in its closed configuration.
Figure 8:
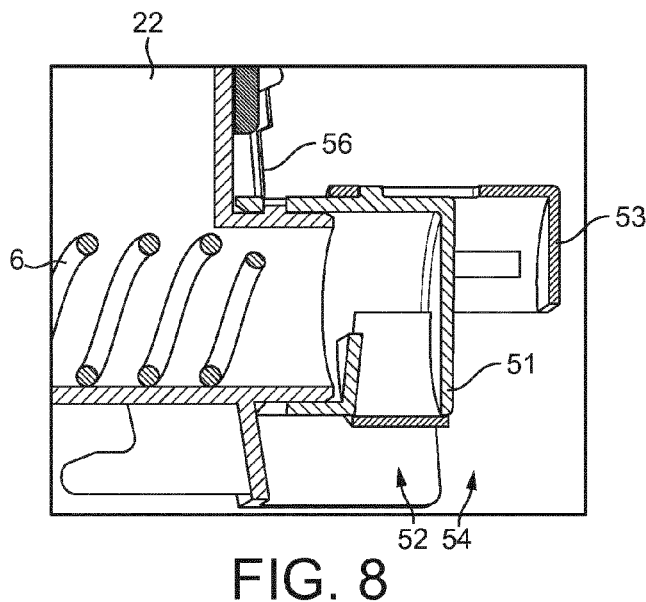
FIG. 8 is cross section view of the discharge port of FIG. 7 in its closed configuration.

If the door is opened, no force acts anymore on the end of the external movable means 53 against the force of the flexible blades as illustrated in FIGS. 7 and 8. Consequently these blades are free to push the external movable means 53 according to their elastic force and to make it slide around the internal delivery tube 51 so that the hollowing-out 54 of the external movable means does not overlap anymore the hollowing-out 52 of the delivery tube and so that the discharge port 5 is closed.

The force of the electromagnet 42 is defined so that when the door is closed and each of the five door bumps exerts a force on each of the external movable means 53 and indirectly against each of the flexible blades 56, then the door resists to the forces exerted by said flexible blades 56. Usually the door is attached to the housing through a hinge and the electromagnet is attached to the door or the housing on the side opposite side of the hinge. In such an embodiment the force to be exerted by the electromagnet 42 is preferably defined so that the momentum of the magnet force at its position relative to the hinge axis is greater than the sum of all the flexible blades forces moments at their positions relative to the hinge axis.

The dispenser of the present invention presents the advantage of enabling the systematic closure of the refilling container discharge port as soon as the door is opened. Then the operator cannot remove the containers out of the dispenser without having them closed. Consequently hygienic issues and dirtiness are avoided. Lastly the operator can more rapidly remove the containers from the dispenser without having to close and check the closure of the discharge port of each container.

The invention claimed is:

1. Beverage dispenser comprising:
    a housing; and
    at least one refillable container for storing bulk beverage ingredient, the refillable container comprising:
    a tank,
    a discharge port at an outlet of the tank,
    at least one beverage preparation unit operatively linked to the refillable container for preparing a beverage from the stored bulk beverage ingredient, and
    a door,
    the refillable container is positioned in the housing and the housing is closed by the door,
    the discharge port of the refillable container interacts with the door so that the discharge port is opened when the door is closed and is closed when the door is opened, the discharge port of the refillable container being closed at rest when the door does not contact the discharge port, and the discharge port being opened when the door is closed, by the door contacting the discharge port and exerting a pressure thereupon.

2. Beverage dispenser according to claim 1, wherein the discharge port comprises:
    an internal delivery tube comprising a hollowing-out in its bottom part,
    an external movable member comprising a hollowing-out in its bottom part, the external movable member covering at least a part of the internal delivery tube and being movable between:
    a position in which the both hollowing-outs of the internal delivery tube and of the external movable member overlap each other, and
    a position in which the surface of the external movable member overlaps and closes the hollowing-out of the internal delivery tube.

3. Beverage dispenser according to claim 2, wherein the internal delivery tube is a cylinder.

4. Beverage dispenser according to claim 2, wherein the internal delivery tube comprises a partial weir in front of its hollowing-out.

5. Beverage dispenser according to claim 2, wherein the external movable member is a cylinder.

6. Beverage dispenser according to claim 1, wherein the door comprises an electromagnetic lock.

7. Beverage dispenser comprising:
    a housing; and
    at least one refillable container for storing bulk beverage ingredient, the refillable container comprising a tank, a discharge port at an outlet of the tank, at least one beverage preparation unit operatively linked to the refillable container for preparing a beverage from the stored bulk beverage ingredient, and a door, the refillable container positioned in the housing and the housing closed by the door, the discharge port of the refillable container interacting with the door so that the discharge port is opened when the door is closed and is closed when the door is opened, and the discharge port comprising an internal delivery tube comprising a hollowing-out in its bottom part, and an external movable member comprising a hollowing-out in its bottom part, the external movable member covering at least a part of the internal delivery tube and being movable between a position in which the both hollowing-outs of the internal delivery tube and of the external movable member overlap each other, and a position in which the surface of the external movable member overlaps and closes the hollowing-out of the internal delivery tube, and a part of the external movable member being pushed by the internal face of the door when the door is closing.

8. Beverage dispenser according to claim 7, wherein the internal face of the door presents at least one bump cooperating with the discharge port of the at least one refillable container when the door is closed.

9. Beverage dispenser comprising:
    a housing; and
    at least one refillable container for storing bulk beverage ingredient, the refillable container comprising a tank, a discharge port at an outlet of the tank, at least one beverage preparation unit operatively linked to the refillable container for preparing a beverage from the stored bulk beverage ingredient, and a door, the refillable container positioned in the housing and the housing closed by the door, the discharge port of the refillable container interacting with the door so that the discharge port is opened with the door is closed and is closed when the door is opened, and the discharge port comprising an internal delivery tube comprising a hollowing-out in its bottom part, and an external movable member comprising a hollowing-out in its bottom part, the external movable member covering at least a part of the internal delivery tube and being movable between a position in which the both hollowing-out of the internal delivery tube and of the external movable member overlap each other, and a position in which the surface of the external movable member overlaps and closes the hollowing-out of the internal delivery tube, and the discharge port comprising at least one elastic member able to exert a force on the external movable member so as to push the external movable member away from the refillable container.

10. Beverage dispenser according to claim 9, wherein the elastic member is a spring or metal blades fixed on one end to the refillable container and cooperating on the other end with the external movable member.

11. Beverage dispenser according to claim 10, wherein the elastic member cooperates with pins on the lateral sides of the external movable member.

12. Beverage dispenser according to claim 9, wherein the elastic member exerts a force sufficient to displace the external movable member to a position in which its hollowing-out does not overlap the hollowing-out of an internal cylinder.

13. Beverage dispenser according to claim 9, wherein the door comprises an electromagnetic lock and the force of the electromagnet of the electromagnetic lock is greater than the force indirectly exerted by the at least one elastic member of the at least one discharge port on the door.

\* \* \* \* \*